(12) United States Patent
Ansari et al.

(10) Patent No.: US 11,380,480 B2
(45) Date of Patent: Jul. 5, 2022

(54) STRIP INDUCTION COIL FOR WIRELESS CHARGING OF A VEHICLE BATTERY

(71) Applicant: Lear Corporation, Southfield, MI (US)

(72) Inventors: Ajmal Imran Ansari, Canton, MI (US); Steven Cong, Novi, MI (US)

(73) Assignee: Lear Corporation, Southfield, MI (US)

( * ) Notice: Subject to any disclaimer, the term of this patent is extended or adjusted under 35 U.S.C. 154(b) by 603 days.

(21) Appl. No.: 16/507,598

(22) Filed: Jul. 10, 2019

(65) Prior Publication Data

US 2021/0012956 A1 Jan. 14, 2021

(51) Int. Cl.
| | |
|---|---|
| *H01F 38/14* | (2006.01) |
| *H02J 7/02* | (2016.01) |
| *H01F 27/32* | (2006.01) |
| *H01F 27/29* | (2006.01) |
| *B60L 53/12* | (2019.01) |
| *B60L 53/34* | (2019.01) |
| *H01F 41/12* | (2006.01) |

(52) U.S. Cl.
CPC .............. *H01F 38/14* (2013.01); *B60L 53/12* (2019.02); *B60L 53/34* (2019.02); *H01F 27/29* (2013.01); *H01F 27/323* (2013.01); *H01F 41/122* (2013.01); *H02J 7/025* (2013.01); *B60Y 2200/91* (2013.01); *B60Y 2300/91* (2013.01)

(58) Field of Classification Search
CPC ....................................... H01F 38/14
USPC ......................................... 336/192
See application file for complete search history.

(56) References Cited

U.S. PATENT DOCUMENTS

| 5,461,215 A | 10/1995 | Haldeman |
| 6,376,978 B1 | 4/2002 | Leung et al. |
| 6,531,942 B2 | 3/2003 | Moncrieff et al. |
| 6,683,510 B1 | 1/2004 | Padilla |
| 6,789,305 B2 | 9/2004 | Seki et al. |
| 8,610,530 B2 | 12/2013 | Singh et al. |
| 10,193,400 B2 | 1/2019 | Long et al. |
| 11,007,887 B2 | 5/2021 | Ansari et al. |

(Continued)

FOREIGN PATENT DOCUMENTS

WO 2015077782 A1 5/2015

OTHER PUBLICATIONS

Yu, Xuehong et al., Watt-Level Wireless Power Transfer Based on Stacked Flex Circuit Technology, Conference Paper in Proceedings—Electronic Components and Technology Conference, Jul. 2011, pp. 2185-2191, 10.1109/ECTC.2011.5898822—Source: IEEE Xplore.

*Primary Examiner* — Jerry D Robbins
(74) *Attorney, Agent, or Firm* — Brooks Kushman P.C.

(57) ABSTRACT

An induction coil is described for wireless charging of a vehicle battery. The induction coil includes a first electrically conductive strip, a second electrically conductive strip, and a first electrically insulative strip between the first and second electrically conductive strips. The first electrically insulative strip electrically isolates the first electrically conductive strip from the second electrically conductive strip. The first electrically conductive strip, the first electrically insulative strip, and the second electrically conductive strip are integrated into stack, where the stack is configured as multiple windings. The first and second electrically conductive strips are adapted to conduct an alternating current. Alternating current flow through the first and second electrically conductive strips and the plurality of windings generates a magnetic field for wireless inductive charging of the vehicle battery.

20 Claims, 8 Drawing Sheets

(56) References Cited

U.S. PATENT DOCUMENTS

| | | |
|---|---|---|
| 2011/0102125 A1 | 5/2011 | Tamura et al. |
| 2014/0021794 A1 | 1/2014 | Kim et al. |
| 2015/0244203 A1 | 8/2015 | Kurz et al. |
| 2015/0340153 A1 | 11/2015 | Lohr et al. |
| 2017/0063132 A1 | 3/2017 | Sultenfuss et al. |
| 2017/0213644 A1 | 7/2017 | Lee et al. |
| 2017/0222472 A1 | 8/2017 | Lee et al. |
| 2017/0228721 A1 | 8/2017 | Lee et al. |
| 2017/0338023 A1 | 11/2017 | Ansari et al. |
| 2018/0211773 A1 | 7/2018 | Krammer |
| 2021/0008988 A1 | 1/2021 | Ansari et al. |

102 — Forming a First Electrically Conductive Strip, a Second Electrically Conductive Strip, and a First Electrically Insulative Strip Into an Integral Stack, Wherein the First Electrically Insulative Strip is Between the First and Second Electrically Conductive Strips and Electrically Isolates the First Electrically Conductive Strip from the Second Electrically Conductive Strip.

↓

104 — Bending the Stack to Form a Plurality of Windings, Wherein the First and Second Electrically Conductive Strips are Adapted to Conduct an Alternating Current, and Wherein Alternating Current Flow Through the First and Second Electrically Conductive Strips and the Plurality of Windings Generates a Magnetic Field for Wireless Inductive Charging of a Vehicle Battery.

↓

106 — Fusing the First Electrically Conductive Strip and the Second Electrically Conductive Strip at an End of the Stack to Form an Electrically Conductive Connector, Wherein the Electrically Conductive Connector Comprises an Attachment Feature for Attachment of the Induction Coil to an Electrical Conductor.

STRIP INDUCTION COIL FOR WIRELESS CHARGING OF A VEHICLE BATTERY

TECHNICAL FIELD

The following relates to a strip induction coil for wireless charging of a vehicle battery.

BACKGROUND

Current wireless chargers for charging traction batteries in electric vehicles, such as hybrid and plug-in hybrid vehicles, utilize a Litz wire. The Litz wire used in traction battery charging consists of large number of strands (e.g., 1000-2000) of fine diameter (e.g., AWG 36-42) magnetic wires. The individual strands are woven in small bundles and multiple bundles are woven together in a precise pattern to form the Litz wire. To retain the shape of the Litz wire, the woven bundles are wrapped by polymer thread called a serve. The serve helps to electrically insulate the Litz wire and also helps in mechanically retaining the cross-sectional shape of the Litz wire.

Due to the fine strand diameter and the serve, Litz wire is easy to bend. However, induction coils made from Litz wire for wireless charging of electric vehicle traction batteries cannot be pre-fabricated. Instead, to make induction coils for wireless charging of electric vehicle traction batteries, Litz wire are wound, either manually or with the aid of simply rotary table, directly on a coil former of a pad. The pad may be a base pad for use in a charging station, or a vehicle pad adapted or configured to be mounted in a vehicle such that the vehicle induction coil may cooperate with a charging station induction coil for wireless charging of the electric vehicle traction batteries. Litz wire based vehicle pad and base pad induction coils thus require labor intensive assembly that is expensive and less repeatable.

For these and other reasons, Litz wire is a high cost product. Moreover, due to the fine strands and serve described above, Litz wire is also inherently prone to damage during assembly. Vehicle pad packaging constraints require sharp bends in the induction coil and the insulation on individual strands of wire insulation consequently undergoes high mechanical strain. In conjunction with such high mechanical strain, thermal cycling during normal usage of the induction coil reduces the life of the Litz wire. In that regard, even though the copper used in Litz wire has excellent thermal conductivity, the air gaps within the wire bundles create conditions that prevent heat from efficiently escaping from the core of the Litz wire. Still further, Litz wire based systems become prohibitively large for high power transfer induction coils.

A need therefore exists for an improved induction coil and an improved method of manufacturing an induction coil for wireless charging of traction batteries in electric vehicles that overcomes the problems described above associated with current Litz wire based induction coils. Such an improved induction coil for wireless charging of electric vehicle traction batteries may comprise interleaved electrically conductive and electrically insulative strips which may be integrated into a stack. Such an improved induction coil may be made by bending the stack. In such an improved induction coil, for higher current and charging power, multiple electrically conductive strips may be used. Because no air gaps exist between the electrically conductive and electrically insulative strips, such an improved induction coil also allows heat generated by operation of the coil to more efficiently escape therefrom.

SUMMARY

According to one non-limiting exemplary embodiment described herein, an induction coil is provided for wireless charging of a vehicle battery. The induction coil comprises a first electrically conductive strip, a second electrically conductive strip, and a first electrically insulative strip between the first and second electrically conductive strips, wherein the first electrically insulative strip electrically isolates the first electrically conductive strip from the second electrically conductive strip. The first electrically conductive strip, the first electrically insulative strip, and the second electrically conductive strip are integrated into stack, the stack configured as a plurality of windings. The first and second electrically conductive strips are adapted to conduct an alternating current, wherein alternating current flow through the first and second electrically conductive strips and the plurality of windings generates a magnetic field for wireless inductive charging of the vehicle battery.

According to another non-limiting exemplary embodiment described herein, an induction coil is provided for wireless charging of a vehicle battery. The induction coil comprises a first electrically conductive strip, a second electrically conductive strip, and a first electrically insulative strip positioned between and attached to the first and second electrically conductive strips, wherein the first electrically insulative strip electrically isolates the first electrically conductive strip from the second electrically conductive strip. The first electrically conductive strip, the first electrically insulative strip, and the second electrically conductive strip are integrated into a stack of parallel strips, wherein the stack is configured as a plurality of windings formed by bending the stack. The first and second electrically conductive strips are adapted to conduct an alternating current, and wherein alternating current flow through the first and second electrically conductive strips and the plurality of windings generates a magnetic field for wireless inductive charging of the vehicle battery.

According to another non-limiting exemplary embodiment described herein, a method of manufacturing an induction coil for wireless charging of a vehicle battery is described. The method comprises forming a first electrically conductive strip, a second electrically conductive strip, and a first electrically insulative strip into an integral stack, wherein the first electrically insulative strip is between the first and second electrically conductive strips and electrically isolates the first electrically conductive strip from the second electrically conductive strip. The method further comprises bending the stack to form a plurality of windings, wherein the first and second electrically conductive strips are adapted to conduct an alternating current, and wherein alternating current flow through the first and second electrically conductive strips and the plurality of windings generates a magnetic field for wireless inductive charging of the vehicle battery.

A detailed description of these and other non-limiting exemplary embodiments of an induction coil for wireless charging of a vehicle battery is set forth below together with the accompanying drawings.

DETAILED DESCRIPTION

As required, detailed non-limiting embodiments are disclosed herein. However, it is to be understood that the disclosed embodiments are merely exemplary and may take various and alternative forms. The figures are not necessarily to scale, and features may be exaggerated or minimized to show details of particular components. Therefore, specific structural and functional details disclosed herein are not to be interpreted as limiting, but merely as a representative basis for teaching one skilled in the art.

As previously described, Litz wire based induction coils for wireless charging of traction batteries of electric vehicles have a number of problems associated therewith. The present disclosure describes an improved induction coil and an improved method of manufacturing an induction for wireless charging of electric vehicle traction batteries that overcome such problems.

In general, the present disclosure describes an induction coil which may be made by bending multiple parallel thin strips of electrically conductive material, typically aluminum or copper, to form a stack. The adjacent strips are electrically insulated from each other by either an electrically insulating coating (e.g., varnish, paint, oxide layer) or by applying a polymer insulation in tape form or heat shrink tubing. The stack may be bent in the shape of a coil appropriate for the application. The thickness of each strip may be determined based on the operating frequency of the wireless system (such as 85 kHz for example, although other operating frequencies may be contemplated or utilized) and the strip material properties of electrical resistivity, permittivity and magnetic permeability.

The present disclosure thus describes an improved induction coil and an improved method of manufacturing an induction coil for wireless charging of electric vehicle traction batteries that may comprise interleaved electrically conductive and electrically insulative strips which may be integrated into a stack. The induction coil may be made by bending the stack. For higher current and charging power, multiple electrically conductive strips may be used. The electrically insulative strips may be an electrically insulative material which may be coated, formed, applied, or otherwise provided on or attached to the electrically conductive strips, and the electrically insulative material may comprise a varnish layer, paint layer, oxide layer, or polymer tape.

Because no air gaps exist between the electrically conductive and electrically insulative strips, Joule heating in the induction coil and hysteresis losses in ferrites adjacent to the induction coil may more efficiently escape. In that regard, the purpose of the coil is to form a magnetic field appropriate for power transfer between a pair of coils, often called primary and secondary coils. The primary coil generates the magnetic field that is captured by the secondary coil. To help shape the magnetic field so that the magnetic field intensity at various spatial locations has a magnitude that promotes efficient power transfer, ferrite tiles are placed adjacent to the coils. The ferrite tiles provide a path of low resistance to magnetic flux and help in integrating the magnetic flux produced by individual turns of the coils. Due to alternating current passing through the coils, the magnetic field also changes its direction and due to hysteresis, causes losses in the adjacent ferrites.

The induction coil of the present disclosure may also include an electrically conductive connector adapted for attachment to one of the first or second electrically conductive strips at an end of the stack, the electrically conductive connector having an attachment feature for attachment to an electrical conductor. In contrast to Litz wire based induction coils, the induction coil design of the present disclosure is physically smaller and lighter at high power levels.

For comparable performance, an induction coil having a stack structure as described in the present disclosure is lower in cost than a Litz wire based induction coil. Strip induction coils can also be manufactured from aluminum, thereby further reducing cost. Moreover, as described previously, induction coils made from Litz wire for wireless charging of electric vehicle traction batteries are wound, either manually or with the aid of simply rotary table, directly on a coil former of a base pad or vehicle pad. Litz wire based induction coils therefore cannot be pre-fabricated and require labor intensive assembly that is expensive and less repeatable. In contrast, an induction coil comprising a stack structure as described in the present disclosure can be pre-fabricated and dropped in a vehicle pad or base pad during the assembly process. Design of the base pad and vehicle pad induction coil carrier thereby becomes substantially simpler and lower in cost.

An induction coil comprising a stack structure as described in the present disclosure also has improved reliability relative to a Litz wire based induction coil. As described previously, due to its fine wire strands and serve, Litz wire is inherently prone to damage during assembly. In that regard, vehicle pad packaging constraints require sharp bends in a Litz wire induction coil and the insulation on individual strands of wire insulation consequently undergoes high mechanical strain. Moreover, thermal cycling during normal usage of a Litz wire induction coil in conjunction with such high mechanical strain reduces the life of the Litz wire. In that regard, even though the copper used in Litz wire has excellent thermal conductivity, the air gaps within the wire bundles create conditions that prevent heat from efficiently escaping from the core of the Litz wire.

In contrast, an induction coil comprising a stack structure as described in the present disclosure is mechanically rugged. Moreover, the stack structure of such an induction coil eliminates air gaps between the electrically conductive and electrically insulative strips to improve cooling of the induction coil, which helps to keep the temperature of the previously described ferrites more uniform and significantly reduces the risk of ferrite cracking. In that same regard, Litz wire based systems become prohibitively large for high power transfer induction coils, while stack induction coil described in the present disclosure allows compact designs even for very high power transfer levels.

With reference to FIGS. 1-10, a more detailed description of non-limiting exemplary embodiments of an induction coil and a method of manufacturing an induction coil for wireless charging of a vehicle battery will be provided. For ease of illustration and to facilitate understanding, like reference numerals have been used herein for like components and features throughout the drawings.

Figure 1:
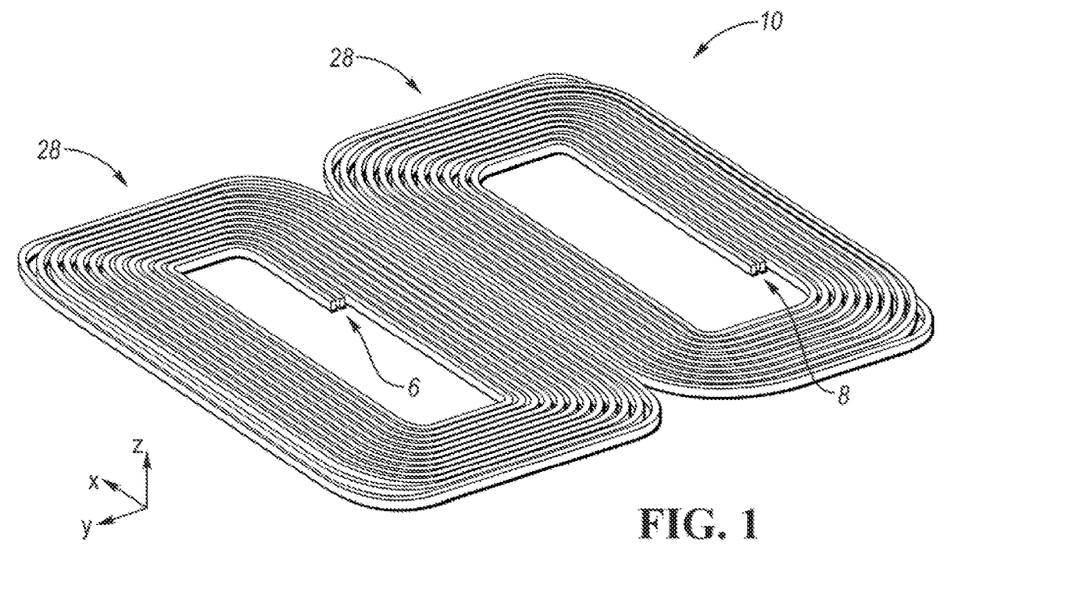
FIG. 1 is a perspective view of an induction coil for wireless charging of a vehicle battery according to one non-limiting exemplary embodiment of the present disclosure.
Figure 2:
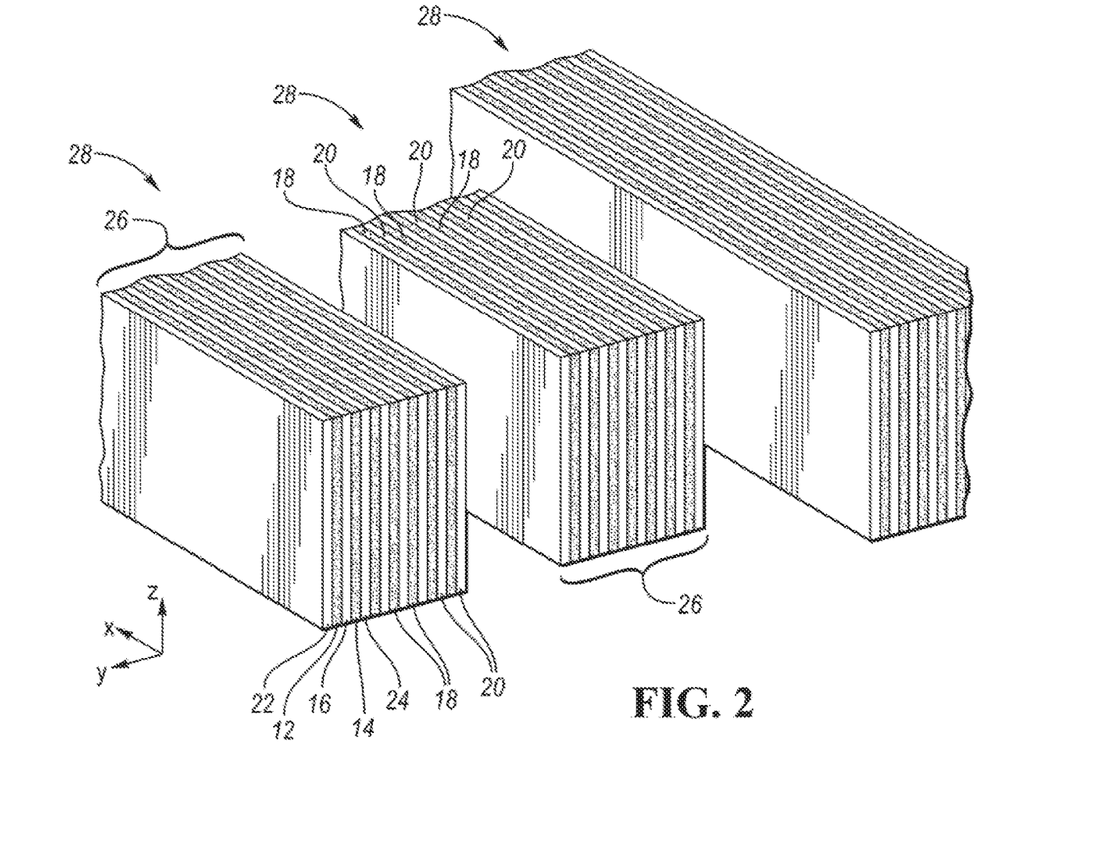
FIG. 2 is a cross-sectional view of an induction coil for wireless charging of a vehicle battery according to one non-limiting exemplary embodiment of the present disclosure.

In that regard, FIG. 1 is a perspective view of an induction coil 10 for wireless charging of a vehicle battery (not shown) according to non-limiting exemplary embodiments of the present disclosure. As seen in FIG. 1, the induction coil 10 may have a D-D design with terminal ends 6, 8. FIG. 2 is a cross-sectional view of an induction coil 10 for wireless charging of a vehicle battery according to one non-limiting exemplary embodiment of the present disclosure. In particular, with reference to the x-y-z coordinate system shown in FIG. 1, FIG. 2 depicts a cross-sectional view of a terminal end 6, 8 of the induction coil 10 taken in an y-z plane.

As seen in FIGS. 1 and 2, the induction coil 10 for wireless charging of a vehicle battery may comprise a first electrically conductive strip 12, a second electrically conductive strip 14, and a first electrically insulative strip 16 between the first 12 and second 14 electrically conductive strips. The first electrically insulative strip 16 electrically isolates the first electrically conductive strip 12 from the second electrically conductive strip 14. As seen in FIG. 2, additional electrically conductive strips 18 and electrically insulative strips 20 may also be provided in an interleaved configuration. In that regard, a second electrically insulative strip 22 may be formed or provided on an outer surface of the first electrically conductive strip 12, and a third electrically insulative strip 24 may be formed or provided on an outer surface of the second electrically conductive strip 14.

The first electrically conductive strip 12, the first electrically insulative strip 16, and the second electrically conductive strip 14 may be integrated into a stack 26. The additional electrically conductive strips 18 and electrically insulative strips 20, 22, 24 may also be integrated into the stack 26. The stack 26 may be configured as a plurality of coils, turns, or windings 28. It should be noted that while the windings 28 of the induction coil 10 shown in FIG. 1 are configured in a plane, such windings 28 may be configured in other shapes as may be desired or required for particular design applications. The electrically conductive strips 12, 14, 18 and the electrically insulative strips 20, 22, 24 may also be coextensive and parallel throughout the stack 26 and/or the plurality of windings 28.

While the stack 26 resulting from the integration of electrically conductive 12, 14, 18 and electrically insulative 20, 22, 24 strips shown in FIG. 2 has electrically insulative strips 20, 22 on the outermost sides or surfaces of the stack 26, such a configuration is not required. That is, in an alternative configuration of the stack 26, the outermost strips thereof may both be electrically conductive, or one outermost strip may be electrically conductive and the other electrically insulative.

The electrically conductive strips 12, 14, 18 of the stack 26 may be adapted to conduct an alternating current. In that regard, alternating current flow through the electrically conductive strips 12, 14, 18 of the stack 26 and the plurality of windings 28 generates a magnetic field for wireless inductive charging of the vehicle battery (not shown). The plurality of windings 28 of the induction coil 10 may be formed by bending one or more portions of the stack 26. In that regard, such bending of a portion of the stack 26 may provide the first electrically conductive strip 12 with a first radius of curvature and the second electrically conductive strip 14 with a second radius of curvature, wherein the second radius of curvature is greater than the first radius of curvature. That is, with reference to the x-y-z coordinate system of FIGS. 1 and 2, a portion of the stack 26 may be bent about, along, or around an axis extending in the z-direction.

Still referring to FIGS. 1 and 2, each of the electrically conductive strips 12, 14, 18 of the stack 26 has a selected length in the x-direction, a selected width or height in the z-direction, and a selected thickness in the y-direction. The length of each of the electrically conductive strips 12, 14, 18 may exceed the width of each of electrically conductive strips 12, 14, 18, and the width of each of the electrically conductive strips 12, 14, 18 may exceed the thickness of each of the electrically conductive strips 12, 14, 18.

Each of the electrically conductive strips 12, 14, 18 may have a thickness selected and/or determined based on a selected, desired and/or designed operating frequency of a wireless charging system. As well, each of the electrically conductive strips 12, 14, 18 may a thickness selected and/or determined based on an electrical resistivity, permittivity, or magnetic permeability of the electrical material of the electrically conductive strip 12, 14, 18. With reference to the x-y-z coordinate system of FIG. 2, in one exemplary embodiment, the dimension of the conductive strips 12, 14, 18 in the y-direction (i.e., thickness) may be from 0.1 to 0.5 millimeters, and the dimension of the conductive strips 12, 14, 18 in the z-direction (i.e., width or height) may be 4 to 12 millimeters, although other dimensions may alternatively be used. In that same regard, the dimension of the insulative strips 20, 22, 24 in the y-direction (i.e., thickness) may be from 0.01 to 0.2 millimeters, and the dimension of the insulative strips 20, 22, 25 in the z-direction (i.e., width or height) may be 4 to 12 millimeters, although other dimensions may alternatively be used. In one exemplary embodiment, the number of conductive strips 12, 14, 18 provided per coil or stack 26 may be from 2 to 12, although other numbers of conductive strips may alternatively be used.

The electrically conductive material of the electrically conductive strips 12, 14, 18 may be aluminum, copper, or other electrically conductive material. The electrically insulative strips 16, 20, 22, 24 may comprise an insulative material coated, formed, applied or otherwise provided on and/or attached to one or more of the electrically conductive strips 12, 14, 18. In that regard, the electrically insulative material may comprise a varnish layer, paint layer, oxide layer, or polymer tape on one or more of the electrically conductive strips 12, 14, 18.

Figure 3:
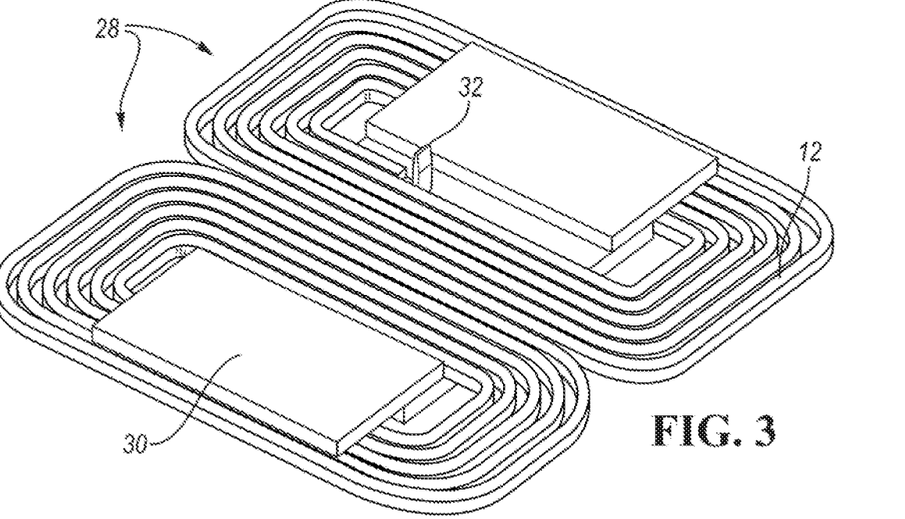
FIG. 3 is a perspective view of an induction coil for wireless charging of a vehicle battery and a coil holder or pad according to one non-limiting exemplary embodiment of the present disclosure.
Figure 4:
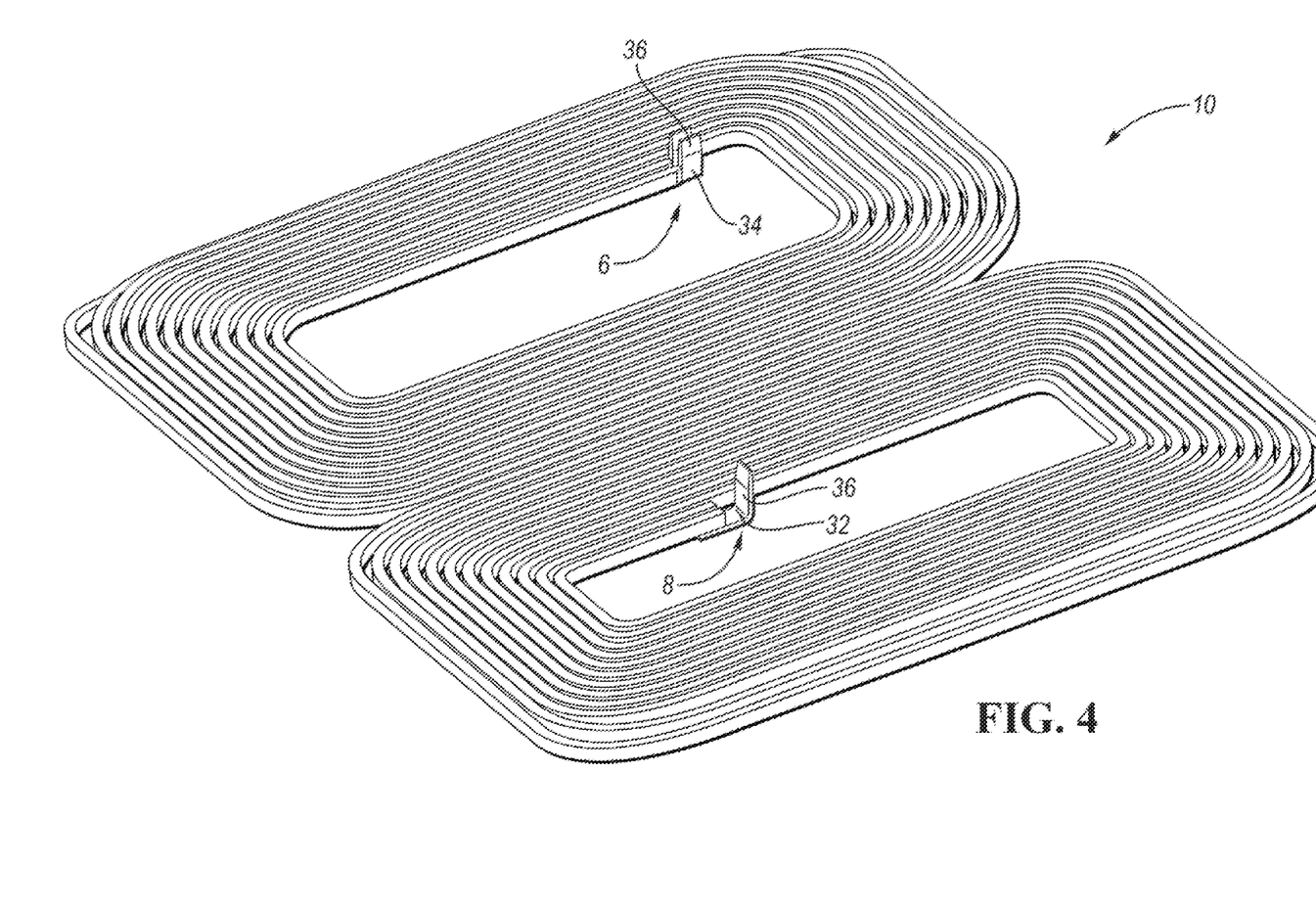
FIG. 4 is a perspective view of an induction coil for wireless charging of a vehicle battery and electrical connectors according to one non-limiting exemplary embodiment of the present disclosure.

With reference to FIG. 3, a perspective view of an induction coil for wireless charging of a vehicle battery according to one non-limiting exemplary embodiment of the present disclosure is shown. As seen therein, the plurality of windings 28 may be adapted or configured for assembly with or attachment to ferrite tiles 30 as part of a coil holder or pad. The ferrite tiles 30 may be a base pad adapted or configured for attachment to or use in a vehicle charging station (not shown), or a vehicle pad adapted or configured for attachment to or use in an electric vehicle (not shown). Referring also to FIGS. 1 and 2, it should be noted that the stack 26 is several orders of magnitude stiffer for bending along the x and y-axes of the axis orientations shown in FIGS. 1 and 2. This makes an entire pad, whether a base pad or vehicle pad, more capable of supporting external loads that the system is designed to withstand. In contrast, in a Litz wire based induction coil design, the coil itself is not capable of carrying external bending loads and all loads therefore must be carried by a housing and/or cover. It should also be noted that while the windings 20 of the induction coil 10 shown in FIG. 1 are configured in a plane (see also FIGS. 3 and 4), such windings 20 may be configured in other shapes as may be desired or required for particular design applications.

Referring next to FIGS. 4-9, perspective and top views of an induction coil for wireless charging of a vehicle battery and electrical connectors according to various non-limiting exemplary embodiments of the present disclosure are shown. As seen therein, and with continuing reference to FIG. 3, the induction coil 10 may further comprise an electrically conductive terminal or connector 32, 34 adapted for attachment to one or more of the electrically conductive strips 12, 14, 18 at an end 6, 8 of the stack 26.

Figure 5:
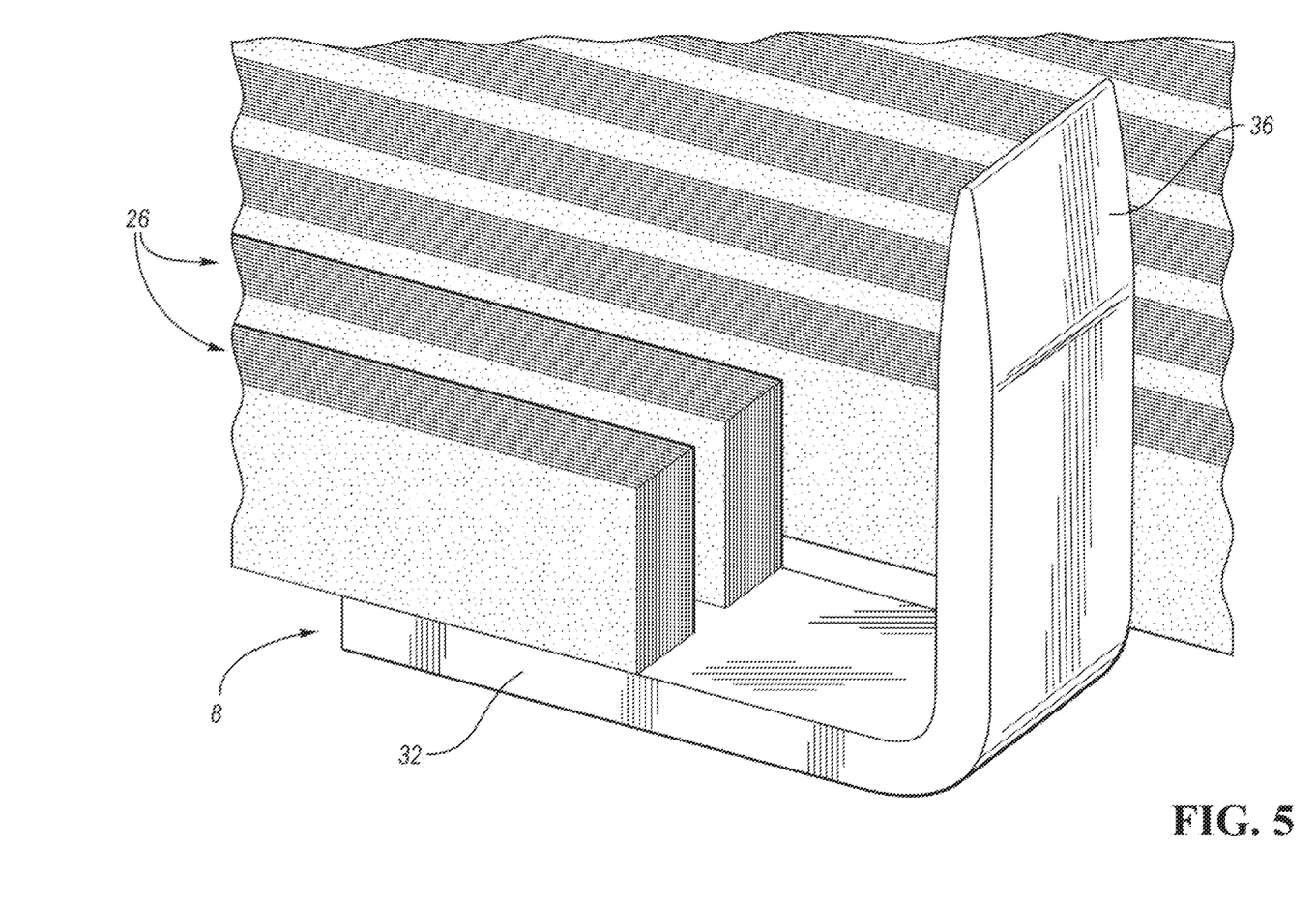
FIG. 5 is a perspective view of an induction coil for wireless charging of a vehicle battery and an electrical connector according to one non-limiting exemplary embodiment of the present disclosure.
Figure 6:
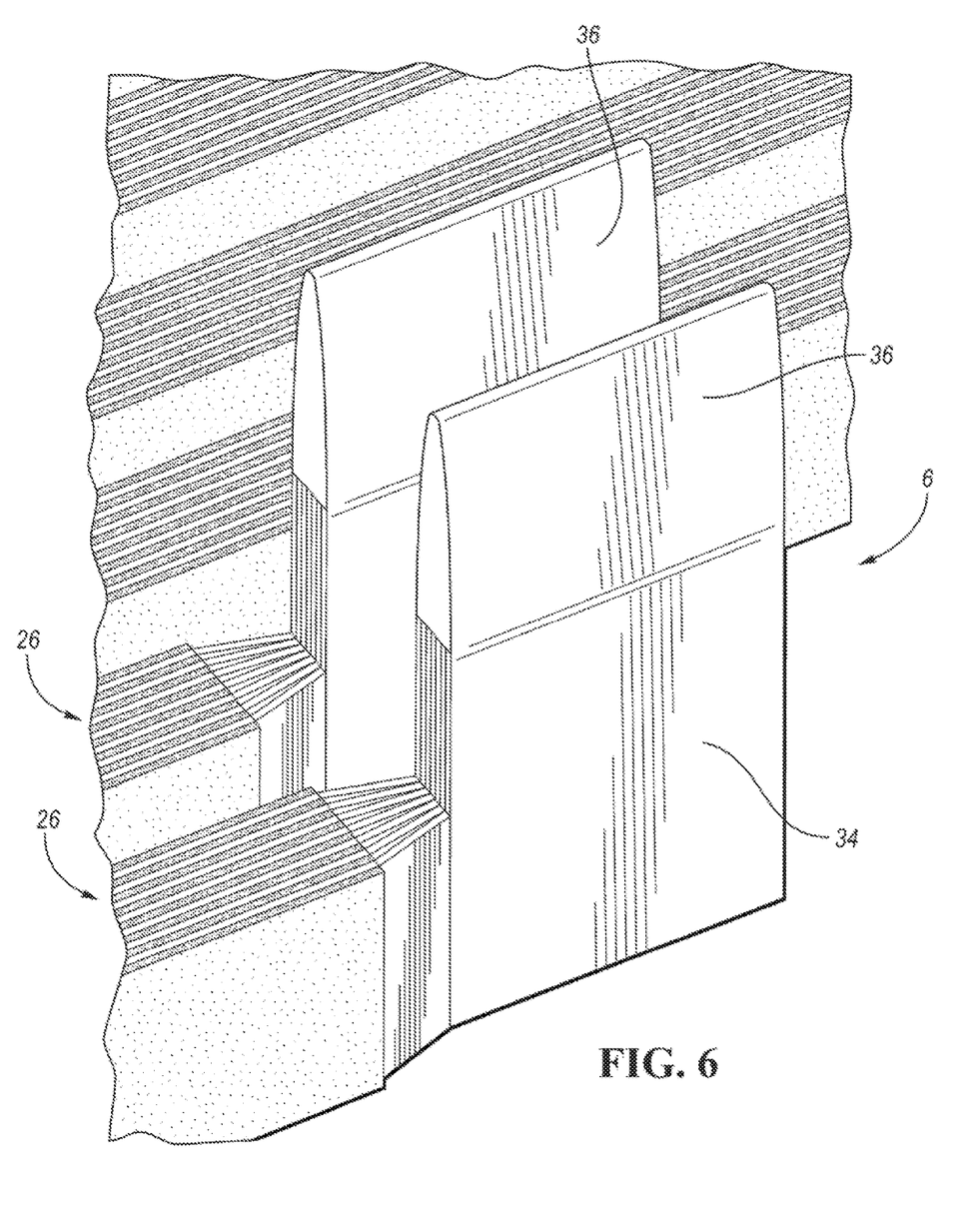
FIG. 6 is a perspective view of an induction coil for wireless charging of a vehicle battery and an electrical connector according to one non-limiting exemplary embodiment of the present disclosure.

In that regard, as seen in FIG. 5, the electrically conductive terminal or connector 32 may be soldered or welded (e.g., ultrasonically) to at least one of the electrically conductive strips 12, 14, 18 at an end 8 of the stack. 26. The electrically conductive connector 32 may have an attachment feature 36 for attachment to an electrical conductor (not shown) to supply an alternating current to the induction coil 10. More specifically, as seen in FIG. 5, the electrically conductive connector 32 may be a right angle blade terminal wherein the attachment feature 36 comprises a male blade configured to cooperate with a female terminal connected to an electrical conductor (not shown).

Alternatively, with reference to FIGS. 6-9, the electrically conductive terminal or connector 34 may be formed as an integral part of the stack 26. As seen therein, at the end 6 of the stack 26, the electrically conductive strips 12, 14, 18 may extend beyond the termination point of the electrically insulative strips 16, 20, 22, 24. In that regard, the electrically insulative strips 18, 20, 22, 24 may be formed such that the insulative strips 18, 2, 22, 24 are not installed near the end 6 of the stack 26 or terminate near the end 6 of the stack 26 before the electrically conductive strips 12, 14, 18. Alternatively, a portion of the electrically insulative strips 16, 20, 22, 24 may be removed from the stack 26 at or near the end 6 of the stack 26 using any known technique. In either fashion, the design of the induction coil 10 of the present disclosure comprising a stack 26 having electrically conductive 12, 14, 8 and electrically insulative 18, 20, 22, 24 strips can inherently incorporate the terminal or connector 34 at an end 6 of the stack 26 and coil 10.

Referring still to FIGS. 6-9, that portion of the electrically conductive strips 12, 14, 18 extending beyond the termination point of the electrically insulative strips 16, 20, 22, 24 may be fused together, such as by swaging, welding (e.g., ultrasonically), or any other known technique. The fused electrically conductive strips 12, 14, 18 may be formed into the electrically conductive terminal or connector 34 having an attachment feature 36 for attachment to an electrical conductor (not shown) to supply an alternating current to the induction coil 10. More specifically, as seen in FIGS. 6-9, the electrically conductive connector 34 may be formed as a blade terminal wherein the attachment feature 36 comprises a male blade configured to cooperate with a female terminal connected to an electrical conductor (not shown).

Figure 7:
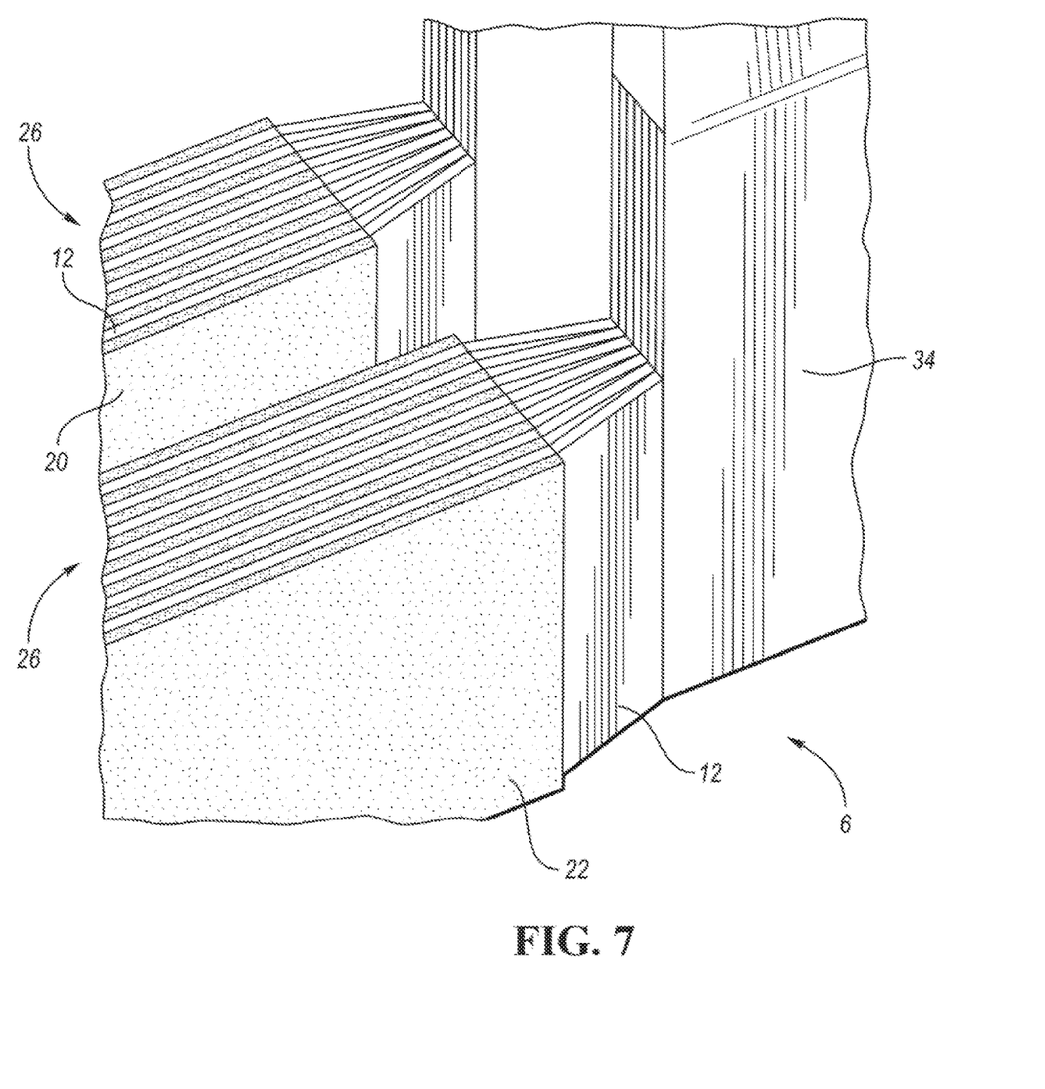
FIG. 7 is a perspective view of an induction coil for wireless charging of a vehicle battery and an electrical connector according to one non-limiting exemplary embodiment of the present disclosure.
Figure 8:
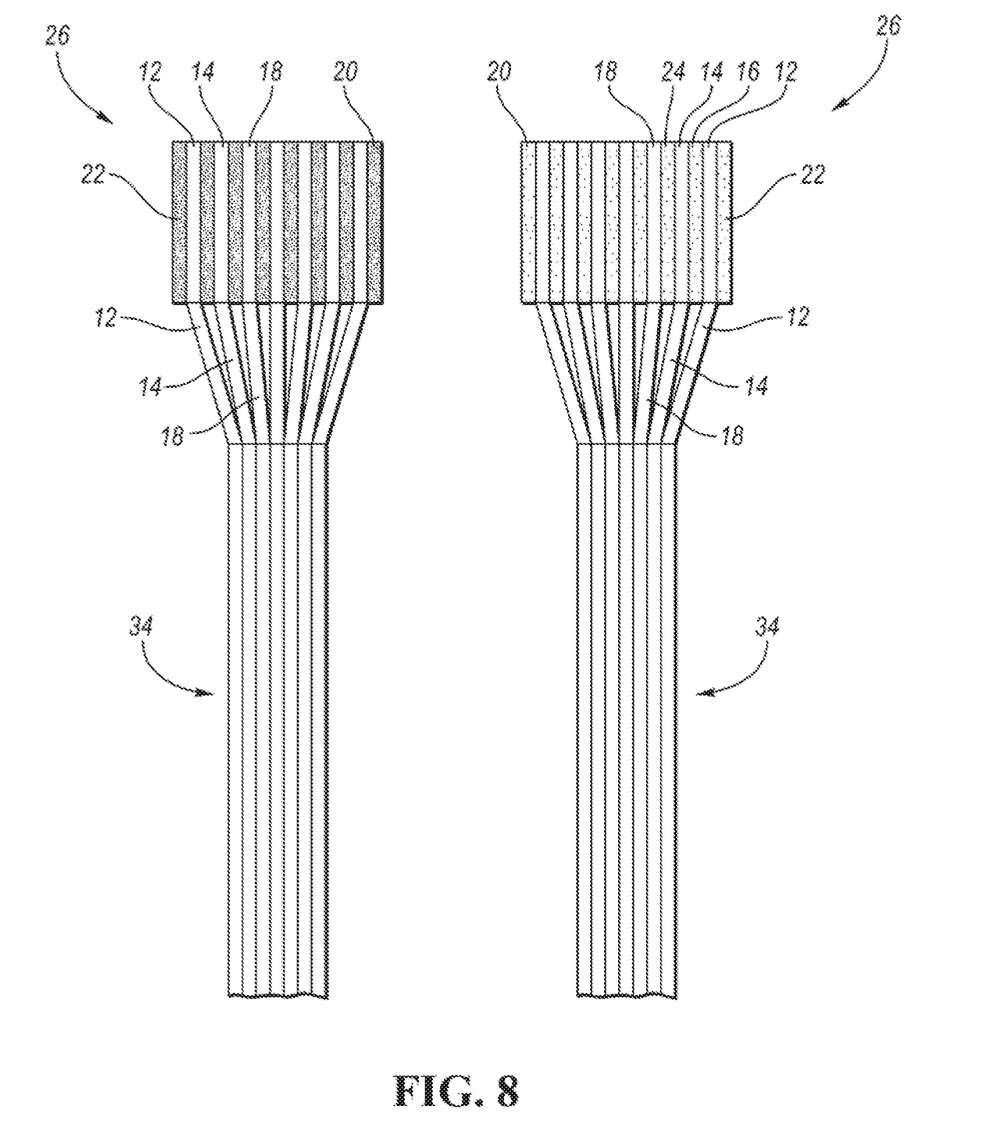
FIG. 8 is a top view of the induction coil for wireless charging of a vehicle battery and the electrical connector of FIG. 6 according to one non-limiting exemplary embodiment of the present disclosure.
Figure 9:
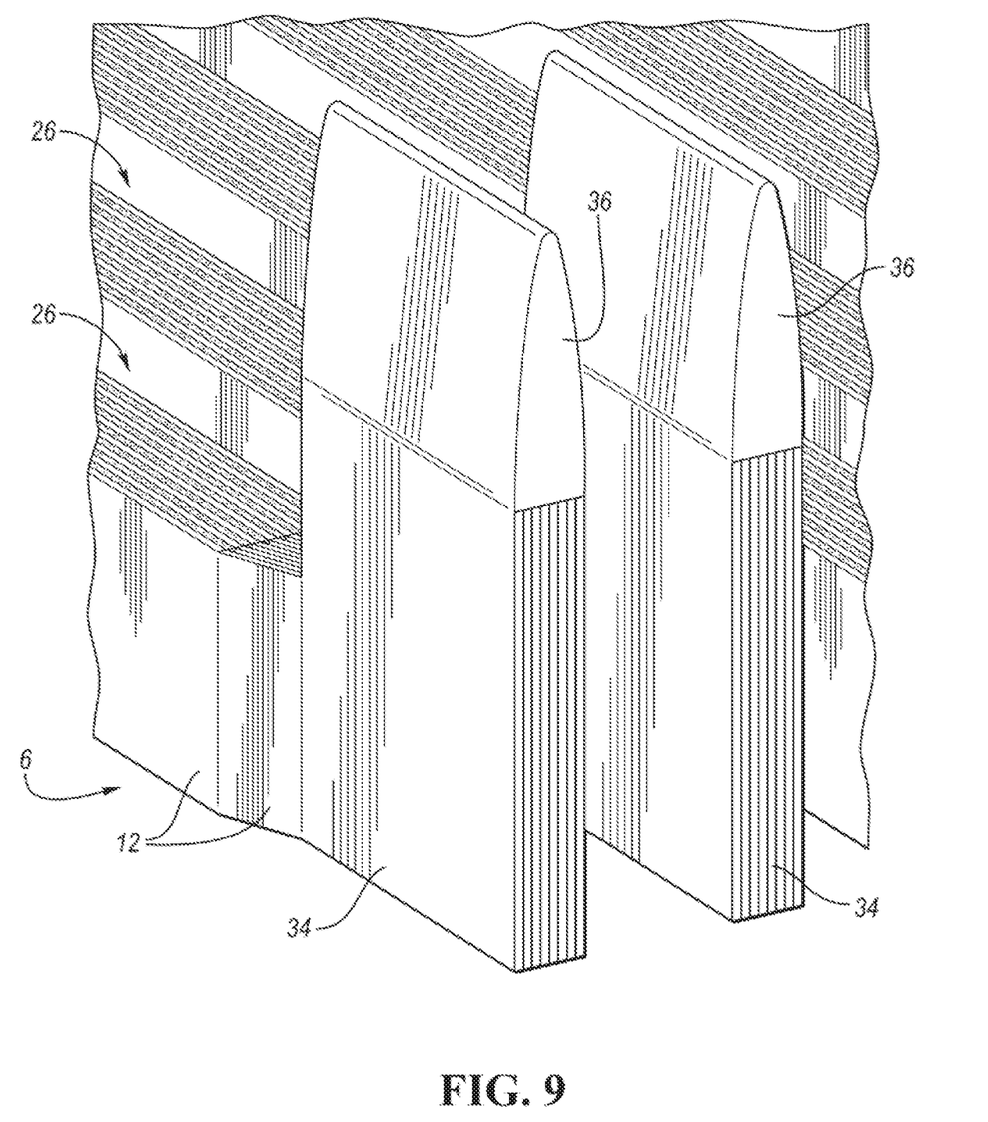
FIG. 9 is a perspective view of an induction coil for wireless charging of a vehicle battery and an electrical connector according to one non-limiting exemplary embodiment of the present disclosure.

As seen in FIGS. 7 and 8, the stack 26 resulting from the integration of electrically conductive strips 12, 14, 18 and the electrically insulative 16, 20, 22, 24 strips may have electrically insulative strips 20, 22 on the outermost sides or surfaces of the stack 26 adjacent the electrically conductive terminal or connector 34 formed from the electrically conductive strips 12, 14, 18. Alternatively, as seen in FIG. 9, the stack 26 resulting from the integration of the electrically conductive strips 12, 14, 18 and the electrically insulative 16, 20, 22, 24 strips may have electrically conductive strips (e.g., 12) on the outermost sides or surfaces of the stack 26 adjacent the electrically conductive terminal or connector 34 formed from the electrically conductive strips 12, 14, 18.

Thus, with reference to FIGS. 1-9, an induction coil 10 for wireless charging of a vehicle battery may include a first electrically conductive strip 12, a second electrically conductive strip 14, and a first electrically insulative strip 16 positioned between and attached to the first 12 and second 14 electrically conductive strips, wherein the first electrically insulative strip 16 electrically isolates the first electrically conductive strip 12 from the second electrically conductive strip 14. The first electrically conductive strip 12, the first electrically insulative strip 16, and the second electrically conductive strip 14 may be integrated into a stack 26 of parallel strips, wherein the stack 26 is configured as a plurality of windings 28 formed by bending the stack. The first 12 and second 14 electrically conductive strips may be adapted to conduct an alternating current, wherein alternating current flow through the first 12 and second 14 electrically conductive strips and the plurality of windings 28 generates a magnetic field for wireless inductive charging of the vehicle battery (not shown).

Figure 10:
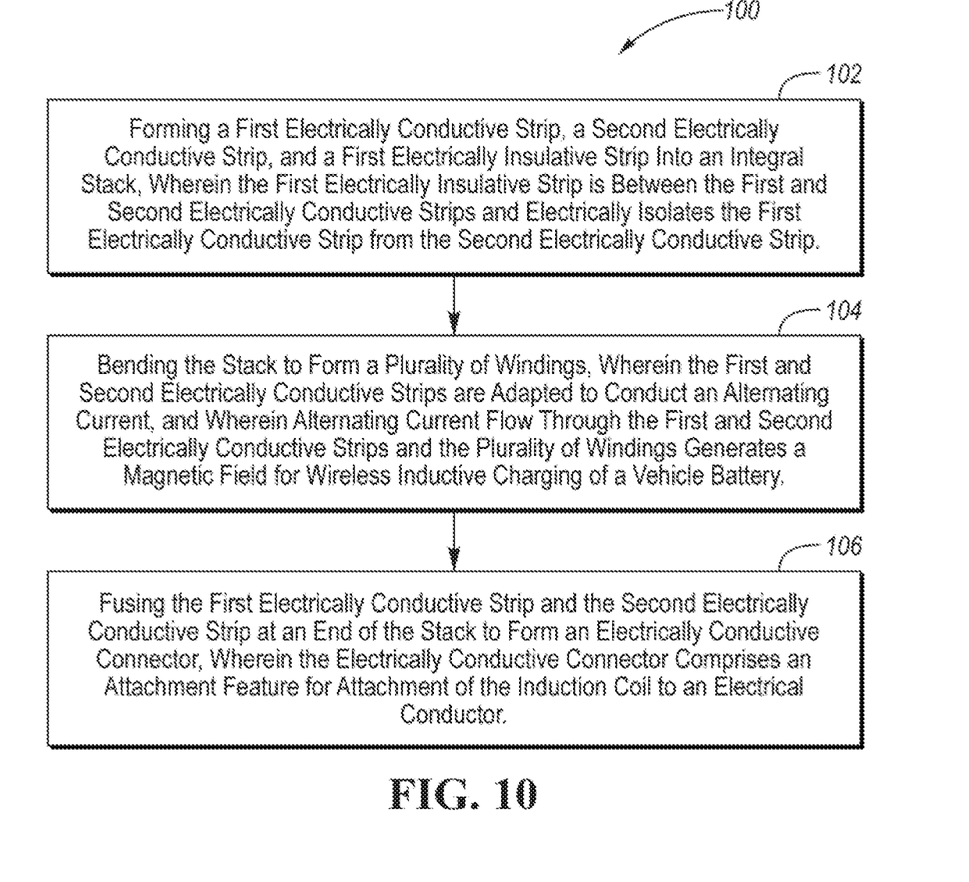
FIG. 10 is a flowchart illustrating a method of manufacturing an induction coil for wireless charging of a vehicle battery according to one non-limiting exemplary embodiment of the present disclosure.

Referring next to FIG. 10, a flowchart is shown illustrating a method 100 of manufacturing an induction coil 10 for wireless charging of a vehicle battery according to one non-limiting exemplary embodiment of the present disclosure. As seen therein, and with continuing reference to FIGS. 1-3, the method 100 of manufacturing an induction coil 10 for wireless charging of a vehicle battery may comprise forming 102 a first electrically conductive strip 12, a second electrically conductive strip 14, and a first electrically insulative strip 16 into an integral stack 26, wherein the first electrically insulative strip 16 is between the first 12 and second 14 electrically conductive strips and electrically isolates the first electrically conductive strip 12 from the second electrically conductive strip 14. In that regard, as previously described, the second electrically conductive strip 16 may be parallel to and/or coextensive with the first electrically conductive strip 12 throughout the plurality of windings 28.

The method 100 may further comprise bending 104 the stack 26 to form a plurality of windings 28, wherein the first 12 and second 14 electrically conductive strips are adapted to conduct an alternating current, and wherein alternating current flow through the first 12 and second 14 electrically conductive strips and the plurality of windings 28 generates a magnetic field for wireless inductive charging of the vehicle battery (not shown). In that regard, bending 104 the stack 26 may comprise bending a portion of the stack 26 to provide the first electrically conductive strip 12 with a first radius of curvature and the second electrically conductive strip 16 with a second radius of curvature, wherein the second radius of curvature is greater than the first radius of curvature. The method may further comprise swaging or welding 106 the first electrically conductive strip 12 and the second electrically conductive strip 14 at an end 6, 8 of the stack 26 to form an electrically conductive connector 32, wherein the electrically conductive connector 32 comprises an attachment feature 36, such as a male blade terminal, for attachment of the induction coil to an electrical conductor The present disclosure thus describes an improved induction coil 10 and an improved method 100 of manufacturing an induction coil 10 for wireless charging of electric vehicle traction batteries that may comprise interleaved electrically conductive 12, 14, 18 and electrically insulative 16, 20, 22, 24 strips which may be integrated into a stack 26. The induction coil 10 may be made by bending 44 the stack 26. For higher current and charging power, multiple electrically conductive strips 12, 14, 18 may be used.

Advantageously, the strip induction coil 10 described in the present disclosure thus lowers material costs, as the strip cost is lower than the Litz wire used in the current induction coil designs. Manual or semi-automated coil winding of Litz wire induction coils can be replaced by sheet metal machinery that bends the stack of strips. The strip induction coil 10 assembly can be dropped in a coil holder of a base station or vehicle. The performance of the strip induction coil 10 is also better than Litz wire based induction coils due to its lower equivalent resistance for the same cross-sectional area occupied by the coil. The Joule losses in the strip induction coil 10 are lower under identical conditions and hence efficiency is improved. The inductance of a strip induction coil 10 is better than that of Litz wire based induction coil and improves the Q factor for power transfer that results in better offset performance and wider Z-height range. The end terminals 32 of the strip induction coil 10 are also easier to attach to the ends 6,8 of the strip induction coil 10 using either soldering or ultrasonic welding, which reduces cost, improves joint quality, and improves reliability. For a given performance and coil material, the size and weight of the strip induction coil 10 is smaller and lower compared to Litz wire based induction coils. The strip induction coil 10 also allows aluminum to be used as the construction material, which results in 40% to 50% weight savings compared to copper Litz wire coil. The lighter coil of strip induction coil 10 results in smaller weight of a vehicle pad and hence the weight of the vehicle that results in improved vehicle efficiency.

The strip induction coil 10 of the present disclosure also allows for a large increase in the magnitude of wireless power transfer for battery charging and other applications. Once again, the performance of the strip induction coil 10 is better than Litz wire based induction coils as a result of a lower equivalent resistance for the same cross sectional area occupied by the coil. The Joule losses in the strip induction coil 10 of the present disclosure are lower under identical conditions and hence efficiency is better, thereby enabling transfer charging of traction batteries in less time compared to Litz wire based induction coils.

As is readily apparent from the foregoing, various non-limiting embodiments of an induction coil for wireless charging of a vehicle battery have been described. While various embodiments have been illustrated and described herein, they are exemplary only and it is not intended that these embodiments illustrate and describe all those possible. Instead, the words used herein are words of description rather than limitation, and it is understood that various changes may be made to these embodiments without departing from the spirit and scope of the following claims.

What is claimed is:

1. An induction coil for wireless charging of a vehicle battery, the induction coil comprising:
   a first electrically conductive strip;
   a second electrically conductive strip; and
   a first electrically insulative strip between the first and second electrically conductive strips, wherein the first electrically insulative strip electrically isolates the first electrically conductive strip from the second electrically conductive strip;
   wherein the first electrically conductive strip, the first electrically insulative strip, and the second electrically conductive strip are integrated into stack, the stack configured as a plurality of windings;
   wherein the first and second electrically conductive strips are to conduct an alternating current, and wherein alternating current flow through the first and second electrically conductive strips and the plurality of windings generates a magnetic field for wireless inductive charging of the vehicle battery.

2. The induction coil of claim 1 further comprising:
   a second electrically insulative strip on an outer surface of the first electrically conductive strip; and
   a third electrically insulative strip on an outer surface of the second electrically conductive strip.

3. The induction coil of claim 1 wherein the first electrically conductive strip, the first electrically insulative strip, and the second electrically conductive strip are parallel throughout the plurality of windings.

4. The induction coil of claim 1 wherein the plurality of windings is formed by bending a portion of the stack to provide the first electrically conductive strip with a first radius of curvature and the second electrically conductive strip with a second radius of curvature, wherein the second radius of curvature is greater than the first radius of curvature.

5. The induction coil of claim 1 further comprising an electrically conductive connector at an end of the stack, the electrically conductive connector comprising the first electrically conductive strip fused to the second electrically conductive strip, the electrically conductive connector having an attachment feature for attachment of the induction coil to an electrical conductor.

6. The induction coil of claim 1 wherein each of the first and second electrically conductive strips has a selected thickness determined based on a selected operating frequency of a wireless charging system.

7. The induction coil of claim 1 wherein the plurality of windings is configured in a plane.

8. The induction coil of claim 1 wherein each of the first and second electrically conductive strips has a selected thickness determined based on an electrical resistivity, permittivity, or magnetic permeability of a material of the strip.

9. The induction coil of claim 1 wherein the electrically insulative strip comprises an insulative material formed on one of the first or second electrically conductive strips.

10. The induction coil of claim 9 wherein the electrically insulative material comprises a varnish layer, paint layer, oxide layer, or polymer tape.

11. The induction coil of claim 1 wherein the plurality of windings is configured for assembly with a pad configured for attachment to a vehicle or a charging station.

12. An induction coil for wireless charging of a vehicle battery, the induction coil comprising:

a first electrically conductive strip;

a second electrically conductive strip;

a first electrically insulative strip positioned between and attached to the first and second electrically conductive strips, wherein the first electrically insulative strip electrically isolates the first electrically conductive strip from the second electrically conductive strip;

wherein the first electrically conductive strip, the first electrically insulative strip, and the second electrically conductive strip are integrated into a stack of parallel strips, wherein the stack is configured as a plurality of windings formed by bending the stack;

wherein the first and second electrically conductive strips are to conduct an alternating current, and wherein alternating current flow through the first and second electrically conductive strips and the plurality of windings generates a magnetic field for wireless inductive charging of the vehicle battery.

13. The induction coil of claim 12 wherein the thickness of each of the first and second electrically conductive strips is determined based on a selected operating frequency of a wireless charging system or an electrical resistivity, a permittivity, or a magnetic permeability of a material of the strip.

14. The induction coil of claim 12 wherein each of the first, second, and third electrically insulative strips comprises an insulative material formed on one of the first or second electrically conductive strips.

15. The induction coil of claim 12 wherein the stack further comprises a second electrically insulative strip attached to an outer surface of the first electrically conductive strip and a third electrically insulative strip attached to an outer surface of the second electrically conductive strip.

16. The induction coil of claim 12 wherein the stack is configured as the plurality of windings by bending a portion of the stack to provide the first electrically conductive strip with a first radius of curvature and the second electrically conductive strip with a second radius of curvature, wherein the second radius of curvature is greater than the first radius of curvature.

17. A method of manufacturing an induction coil for wireless charging of a vehicle battery, the method comprising:

forming a first electrically conductive strip, a second electrically conductive strip, and a first electrically insulative strip into an integral stack, wherein the first electrically insulative strip is between the first and second electrically conductive strips and electrically isolates the first electrically conductive strip from the second electrically conductive strip; and bending the stack to form a plurality of windings, wherein the first and second electrically conductive strips are to conduct an alternating current, and wherein alternating current flow through the first and second electrically conductive strips and the plurality of windings generates a magnetic field for wireless inductive charging of the vehicle battery.

18. The method of claim 17 wherein the second electrically conductive strip is parallel to the first electrically conductive strip throughout the plurality of windings.

19. The method of claim 17 wherein bending the stack comprises bending a portion of the stack to provide the first electrically conductive strip with a first radius of curvature and the second electrically conductive strip with a second radius of curvature, wherein the second radius of curvature is greater than the first radius of curvature.

20. The method of claim 17 further comprising fusing the first electrically conductive strip and the second electrically conductive strip at an end of the stack to form an electrically conductive connector, wherein the electrically conductive connector comprises an attachment feature for attachment of the induction coil to an electrical conductor.

\* \* \* \* \*